United States Patent
Emig et al.

(10) Patent No.: US 7,507,272 B2
(45) Date of Patent: Mar. 24, 2009

(54) VACUUM FILTER BAG WITH ODOR REMOVING EFFECT

(75) Inventors: Dietmar Emig, Aschau (DE); Albrecht Klimmek, Bruckmuhl (DE); Ernst Raabe, Raubling (DE)

(73) Assignee: Neenah Gessner GmbH, Bruckmuhl (DE)

( * ) Notice: Subject to any disclaimer, the term of this patent is extended or adjusted under 35 U.S.C. 154(b) by 459 days.

(21) Appl. No.: 11/044,673

(22) Filed: Jan. 27, 2005

(65) Prior Publication Data

US 2006/0137529 A1   Jun. 29, 2006

(30) Foreign Application Priority Data

Dec. 24, 2004  (EP) .................................. 04030781

(51) Int. Cl.
  *B01D 39/02*  (2006.01)

(52) U.S. Cl. .................. 55/527; 55/DIG. 2; 96/135
(58) Field of Classification Search .................. 55/527, 55/DIG. 2; 96/135
  See application file for complete search history.

(56) References Cited

U.S. PATENT DOCUMENTS

| | | | |
|---|---|---|---|
| 5,074,997 A | | 12/1991 | Riley et al. |
| 5,248,323 A | | 9/1993 | Stevenson |
| 5,554,288 A | | 9/1996 | Rydell et al. |
| 5,647,881 A | * | 7/1997 | Zhang et al. .................. 55/382 |
| 6,423,123 B1 | * | 7/2002 | Rosenberg et al. ............ 96/154 |
| 2003/0000389 A1 | | 1/2003 | Schultheiss et al. |

FOREIGN PATENT DOCUMENTS

| | | |
|---|---|---|
| DE | 196 15 209 C1 | 4/1996 |
| EP | 1 258 277 A1 | 11/2002 |
| GB | 2 288 749 A | 11/1995 |
| GB | 2 292 883 A | 3/1996 |
| JP | 61271013 A | 12/1986 |
| JP | 05084191 A | 4/1993 |
| JP | 06070871/PN | 3/1994 |

* cited by examiner

*Primary Examiner*—Robert A Hopkins
(74) *Attorney, Agent, or Firm*—Scully, Scott, Murphy & Presser, P.C.

(57) ABSTRACT

The present invention relates to a vacuum filter bag comprising a layer containing immobilized odor-retaining particles characterized in that the abrasion loss of said odor-retaining particles caused by an air flow of 90 cm/s through a 200 cm$^2$ specimen of said layer for two hours, measured in accordance with DIN 44956 T2, is 0 to 10% by weight of the total odor-retaining particles present before starting the air flow. The vacuum filter bags of the invention have a high dust holding capacity and an excellent long lasting odor removing effect.

8 Claims, No Drawings

VACUUM FILTER BAG WITH ODOR REMOVING EFFECT

FIELD OF THE INVENTION

The present invention relates to a vacuum filter bag having an excellent odor removing effect.

BACKGROUND ART

In the field of vacuum filter bags there has recently been a trend towards longer service life. Thus, the current vacuum filter bags are capable of holding much more dust than previously before the bag is completely filled and as such to be replaced. Such vacuum filter bags are, for example, described in EP-A-1 254 693 and EP-A-1 258 277. Since these types of vacuum filter bags, due to their higher dust holding capacity, must be replaced less frequently, the bags remain in the vacuum cleaner for a longer period of time. Consequently, more malodors are generated in the bags.

The malodors are due to the presence of organic materials such as pet hairs, and microorganisms, such as bacteria, mold, or mites, which are soaked up in addition to mineral dust particles upon vacuuming. Through the decomposition of the organic materials being favored by the presence of humidity, malodors are generated which will accumulate in the dust compartment. If the vacuum cleaner is switched on after standing for a longer time, these malodors are blown out all at once. Most users find these malodors unpleasant and unhygienic.

It is known to equip vacuum cleaners with separate odor filters with the purpose of absorbing malodors.

These odor filters usually contain active carbon and are arranged downstream of the filter bag and the turbine as a separate filter unit, e.g., a filter cassette. Such odor filter units are known, e.g., from DE-A-42 40 172 and DE-A-42 04 553. Using such filter cassettes has the drawback that the vacuum cleaner must be specifically constructed to allow their use. Alternative odor filters arranged downstream of the vacuum filter bag and upstream of the turbine are disclosed in DE-A-195 13 658.

Separate filter units will generate additional filter resistance with a concomitant reduced airflow rate. Consequently, separate odor filter units such as filter cassettes are detrimental to high airflow rate and service life of the vacuum filter bag. Furthermore, the odor filter cassettes are arranged distant from the place where the malodors are generated. As such they may not retain the malodors being emitted when the vacuum cleaner is not in use. When the vacuum cleaner is switched on, all malodors generated in the time since its last use have to be retained at once i.e. shock-wise. This is usually accomplished only insufficiently. The insufficient absorption of malodors is due to the short residence time resulting from the high air velocity of about 1.8 m/s in a standard vacuum cleaner. The absorption efficiency is strongly dependent on the residence time of the odor components in the absorption medium. In the separate odor filter units of the prior art, the odor components contained in the air flow do not stay long enough in contact with the active carbon to be absorbed to a sufficient degree. In addition, the user has no possibility to check whether the separate downstream odor filter is depleted already and cannot absorb malodors any longer. Consequently, the filter is either replaced too early i.e. when this has significant absorption capacity left, which is detrimental from an economical point of view, or too late i.e. when malodors are discernable already.

The idea of absorbing malodors immediately upon their formation by providing the dust filter bag as such with odor absorbing materials is generally addressed in DE-A-195 31 343.

In view of the above drawbacks of separate odor filters, DE 19 615 209 C1 proposes a vacuum filter bag consisting of at least two layers wherein the upstream layer consists of filter paper provided with adsorber particles such as carbon or natural or synthetic zeolites. The second layer arranged on the downstream side is a covering layer with particle filter properties. The adsorber particles are in close proximity of the place of malodor generation and are described to achieve, as such, a good odor removal through the longer contact time of odor component and adsorber particles. Since the adsorber particles are incorporated into the vacuum filter bag, these will be replaced simultaneously with the dust removal filter unit which makes the handling more convenient than in filter systems with separate odor filter units.

However, the vacuum filter bags of DE 19 615 209 C1 are still unsatisfactory.

According to DE 19 615 209 C1, the adsorber particles may be introduced into the filter paper by way of impregnation. In the alternative, it is possible to cover at least one side of the filter paper that contains adsorber particles. No detailed description on how the adsorber particles are introduced into the filter paper is given. Evidently, they are only weakly fixed to the filter paper and a substantial proportion of them will be released by the air flowing through the filter upon use in a vacuum cleaner. Otherwise, the protection of the adsorber particles against abrasion and loss by means of the covering layer on the downstream side would not be necessary. The covering layer will capture adsorber particles released from the filter paper. As such, the released particles captured in the covering layer will contribute to the overall filter resistance by bag clogging. In addition, the capability of the particles to absorb odor components may be deteriorated or even be lost completely when released from the filter paper. Due to the abrasion of the odor-retaining particles, the odor absorption of the vacuum cleaner bag of the above patent may therefore decrease with time and can be expected to be low towards the end of a lifetime of the vacuum filter bag. Moreover, this vacuum filter bag requires the presence of at least two layers, and each layer will contribute to the overall filter resistance and bag clogging. Hence, the vacuum filter bag of DE 19 615 209 C1 is still not satisfactory with respect to the service life of the filter bag, both in terms of the malodor absorption and the dust holding capability.

WO 00/40134 describes a multi-layer vacuum filter bag comprising a layer of adsorption material such as active carbon or zeolites. Thereby, the adsorption material may be arranged loosely between two other layers or may be incorporated into a carrier material such as porous foam, reticulated foam, or a non-woven. WO 00/40134 does not describe how the absorption material is incorporated into the carrier. Using loose adsorption material may cause problems upon bag manufacturing. For instance, the material may get lost at the cutting edges upon cutting the web and punching the in-flow opening. This may lead to contamination of the manufacturing machines, giving rise to failures in the bag manufacturing process.

SUMMARY OF THE INVENTION

In view of the prior art as discussed above, the object of the invention is to provide a vacuum filter bag having a simple construction and allowing a high dust holding capacity and odor removing effect to be retained over the entire service life of the filter bag.

According to the invention, the above object is solved by a vacuum filter bag comprising a layer containing immobilized odor-retaining particles characterized in that the abrasion loss of said odor-retaining particles caused by an air flow of 90 cm/s through a 200 cm$^2$ specimen of said layer for two hours, measured in accordance with DIN 44956 T2, is 0 to 10% by weight of the total odor-retaining particles present before the air is allowed to flow through said layer.

In the present application, the term of "odor-retaining particles" means particles that are capable of retaining odor components or compounds present in the air stream flowing through the vacuum filter bag of the invention. As such, these particles either have the capability of absorbing the odor components or of adsorbing the odor components provided the adsorption strength is sufficient to retain the odor components. It will be understood that for the purpose of the present invention, "odor" especially refers to the malodors, i.e. the bad smell due to the presence of organic materials in the debris to be removed with a vacuum cleaner provided with the vacuum filter bag of the invention. Occasionally, the layer containing immobilized odor-retaining particles according to the invention will simply be referred to as "odor filter layer", hereinafter.

The odor-retaining particles for use in the present invention are not particularly limited. According to a preferred embodiment, the odor-retaining particles are made of zeolite or carbon. Particularly preferred are zeolite particles. In the alternative, particles of the zeolite-related aluminum phosphate molecular sieves may be used.

Zeolites, also known as molecular sieves, are open-framework crystalline aluminosilicates, the lattice of which encloses molecular arrays of channels and cavities. Both natural and synthetic zeolites may be useful. The odor-retaining particles made of carbon may be spherical coal and/or granular or molded coal.

It goes without saying that the layers constituting the vacuum filter bags of the invention are permeable to air. Typically, the vacuum filter bags of the invention have an air permeability of 80 to 500 l/m$^2$s.

According to a preferred embodiment, the odor filter layer is selected from a filter paper layer, dry laid non-woven layer, wet laid non-woven layer, spun bond non-woven layer, and melt blown layer. According to a particularly preferred embodiment, the layer is a filter paper layer.

Unless indicated otherwise, the air permeability has been measured in accordance with EN ISO 9237, the basis weight in accordance with EN ISO 536, the layer thickness in accordance with EN ISO 534 (caliper pressure 20 kPa), and the breaking resistance in accordance with EN ISO 1924-2.

The filter paper layer for use as the odor filter layer in the vacuum filter bag of the present invention preferably has, at a thickness of 0.1 to 0.3 mm, a basis weight of 30-80 g/m$^2$ and an air permeability of 80-500 l/m$^2$s. The breaking resistance of the filter paper preferably is 20-70 N/15 mm strip width in the longitudinal direction and 15-45 N/15 mm strip width in the transverse direction. Usually, it is formed from long or short cellulose fibers. For instance, long fiber cellulose, such as sulfate pulp, short fiber cellulose, such as from eucalyptus, as well as cellulose obtained from annuals, such as hemp, abaca and sisal, may be used. The cellulose may be bleached or unbleached. Furthermore, synthetic fibers, e.g., viscose fibers, polypropylene or polyester fibers may be used, provided at least 50 wt % of fibers are cellulose fibers. The synthetic fibers may be of different thickness, usually 9-20 µm, and different cutting length, usually 3-15 mm. So-called bi-component fibers may be used if desired. Bi-component fibers consist of polymers of different melting points. Moreover, melt-bonding fibers may be used.

According to another embodiment, the odor filter layer may be a dry laid non-woven. Preferably, the dry laid non-woven has, at a thickness of 0.1-2.0 mm, a basis weight of 10-60 g/m$^2$, an air permeability of 700-12,000 l/m$^2$s, and a breaking resistance in the longitudinal direction of more than 5 N/15 mm strip width and in the transverse direction of more than 2 N/15 mm strip width.

The wet laid non-woven layer for use as the odor filter layer of the invention preferably has a basis weight of 6-70 g/m$^2$, a thickness of 0.05-0.35 mm, and an air permeability of 300-4,000 l/m$^2$s. The wet laid non-woven preferably has a breaking resistance in the longitudinal direction of more than 5 N/15 mm strip width and in the transverse direction of more than 2-10 N/15 mm strip width. As opposed to filter paper, which is usually also prepared by wet laying, at least 50 wt % of the fibers in the wet laid non-woven are synthetic fibers.

The spun bond non-woven preferably has, at a thickness of 0.05-0.30 mm, a basis weight of 8-40 g/m$^2$, and an air permeability of 700-12,000 l/m$^2$s. It preferably has a breaking resistance in the longitudinal direction of more than 7 N/15 mm strip width and in the transverse direction of more than 3 N/15 mm strip width.

The melt blown may be formed from a thermoplastic material, preferably from polyolefin, polyamide, polyester or copolymers thereof. The melt blown layer preferably has a basis weight of 10-80 g/m$^2$, a thickness of 0.10-4 mm, and an air permeability of 100-2,000 l/m$^2$s. The melt blown non-woven preferably has a breaking resistance in the longitudinal direction of 2-12 N/15 mm strip width and in the transverse direction of 1-10 N/15 mm strip width. Further details on melt blown layers are described in EP-B-0 338 479.

In principle, the above types of layers and methods for their manufacture are known in the art. The present invention renders feasible for the first time to incorporate the odor-retaining particles such that the abrasion loss caused by the flow of air occurring in a vacuum cleaner is 0 to 10%, preferably $\leq$5%, more preferably $\leq$2%, even more preferably $\leq$1% by weight of the total odor-retaining particles present before starting the air flow. According to the most preferred embodiment, the abrasion loss of the odor-retaining particles is substantially zero. "Substantially zero" means that under the measuring conditions for the abrasion loss as defined hereinbelow, no measurable quantities of odor-retaining particles are released from the filter layer by the flowing air and are, as such, lost.

The content of immobilized odor-retaining particles in the vacuum filter bag of the invention is not particularly limited. In view of odor removal efficiency and filtration properties, the content is preferably 4 to 14 wt %, in terms of the weight of the odor filter layer, more preferably 4 to 10 wt % and especially 6 to 8 wt %.

For determining the abrasion loss caused by the air flow through the vacuum filter bag according to the invention, the test apparatus according to DIN 44956 T2 is used. More details on the apparatus and the abrasion test will be given in the examples. It is to be noted that the air flow during the abrasion test of 90 cm/s (18 l/s) is above a usual one in commercial vacuum cleaners.

In the vacuum filter bags of the invention, the immobilized odor-retaining particles are fixed more strongly to the odor filter layer than in the vacuum filter bags of the prior art.

There are no particular limitations as to the positioning of the particle-containing layer in the vacuum filter bag of the invention. According to a preferred embodiment, however, the particles-containing layer is arranged on the most downstream side of the vacuum filter bag. This offers various advantages. As opposed to the vacuum filter bags of the prior art such as DE 19 615 209 C1 which require a covering layer on the most downstream side, the construction of the above embodiment of the vacuum filter bag of the invention is much simpler. In fact, the vacuum filter bag of the invention may be a one-layer filter bag consisting only of the particle-containing layer, such as a filter paper layer containing the immobilized odor-retaining particles of the invention. A thus treated filter paper layer, apart from acting as an odor filter, will retain a good dust removal activity. That means, the dust filter function will not be altered by incorporating the odor-retaining particles. Reducing the number of layers in the filter bag, e.g. to one, will decrease the volume of the vacuum filter bag with the known advantages in sale and distribution.

In the case of a vacuum filter bag comprising at least one upstream layer in addition to the odor filter layer, the upstream layer may be selected from melt blown, dry laid and wet laid non-woven and spun bond non-woven. The filter properties of these layers are preferably the same as defined above for the corresponding particle-containing layers. In the alternative, the layer upstream of the odor filter layer may be a membrane or a layer coated with nano fibers such described in DE 199 19 809 (U.S. Pat. No. 6,395,046). For instance, the above nano fibers may be deposited on the above-exemplified layers.

According to another preferred embodiment, the vacuum filter bag of the invention comprises two layers, i.e. an upstream layer and the odor filter layer. Particularly preferred combinations are as follows:

| Upstream layer | Downstream odor filter layer |
|---|---|
| Melt blown | Filter paper |
| Melt blown | Spun bond non-woven |
| Melt blown | Melt blown |
| Wet laid non-woven | Filter paper |

If required, one or more further layers may be provided upstream of the odor filter layer.

The layer(s) may be formed into a vacuum filter bag using conventional methods such as described in DE-A-38 12 849.

The present inventors have surprisingly found that the odor-retaining particles can be introduced during the manufacture of the odor filter layer such that the abrasion loss is very small, while maintaining the excellent odor removal efficiency.

Dependent on the type of odor filter layer, there are several ways to incorporate the odor-retaining particles such that they are strongly fixed, as shown by their low abrasion loss, while at the same time retaining their excellent odor removal efficiency.

The filter paper layer containing the odor-retaining particles of the invention may be manufactured in accordance with the so-called wet laying process. First, the components are dispersed in water in a so-called pulper. Pulpers are vats wherein water and cellulose and/or further fibers such as described above are homogenized under high shearing forces and then they are separated. Subsequently, the different fibers are combined in a mixing vat. Thereby materials that are conventional in paper manufacturing are used. The skilled person will readily select the appropriate materials and their proportions to achieve the desired properties of the final filter paper.

The homogeneous fiber mixture is then fed to the screen of the paper machine and formed into a continuous web. The obtained web is then dried. The drying may be carried out with the aid of heated cylinders, air-float web drying, infrared drying or through air drying. Since the strength of the dry web is insufficient for the use in vacuum cleaners, it is necessary to consolidate the web. The consolidation is accomplished by applying binders. When so-called melt bonding fibers are used for manufacturing the filter paper, the impregnation with binders may be omitted, and the consolidation is achieved by the partial melting of the bonding fibers. This process is described for example in EP-A-1 199 094.

The wet laid non-woven is prepared using the wet laying process. This corresponds to the above process of paper manufacture and is, in principle, known to the skilled person. Similar to the above process for preparing filter paper, the consolidation of the web is achieved through impregnation or, in the case of melt bonding fibers or bi-component fibers by way of thermal calendering.

According to the invention, the odor-retaining particles may be incorporated in filter paper and wet laid non-wovens, in the following way:

Incorporating the odor-retaining particles in the bulk of filter paper and wet laid non-woven;

Incorporating the odor-retaining particles by adding this to the binder.

Both options will be described in some more detail, hereinafter.

To incorporate the odor-retaining particles in the bulk, these may be added to the cellulose and/or the further fibers. Thereby, the odor-retaining particles are usually added to the pulper, which is filled with water only. Following dispersion, the cellulose fibers and/or other fibers are added. The particles are fixed with the aid of fixing agents, such as, for example, aluminum sulfate (alum), polyaluminum chloride (PAC), polyaluminum nitrate (PAN), polyacryl amide (PAM) or polyethylene amine. The web is then consolidated by application of binders or, in the case of melt bonding fibers or bi-component fibers by way of thermal calendering.

In the alternative, the odor-retaining particles may be incorporated in the filter paper or non-woven by adding this to the binder as follows. A so-called size press may be used. Usually, size presses consist of two rubber rolls of different hardness, which are rotated in contact with each other. The binder may be fed to the roll clearance, and so the web being passed between the rolls is impregnated. The application of the binder to the base paper corresponds to the method which is usual in the art. More details are described in general textbooks, such as *Papiermacher Taschenbuch, 6$^{th}$ Edition*.

The binder used for consolidating the base paper may consist of polyvinyl acetate, polyvinyl alcohol, polyacrylate, natural starch or mixtures thereof. The binder is mixed with water prior to application to the base paper. To incorporate the odor-retaining particles in the base paper, they are added, preferably in powder form, to the aqueous binder mixture. Thereby, sufficient mixing is preferred to avoid agglutination of the particles. The thus-obtained suspension is fed to the size press as described above.

After passing the size press, the wet web must be dried again.

In the alternative, the binder containing the odor-retaining particles may be sprayed onto the filter paper or wet laid non-woven using spray nozzles. Again, the thus-obtained web containing immobilized odor-retaining particles must be dried subsequently.

The manufacture of non-wovens is generally described in "Vliesstoffe", W. Albrecht, H. Fuchs, W. Kittelmann, Wiley-VCH Verlag, 2000.

Dry laid non-wovens, which may be produced using the carding or air laying method, may also be used as odor filter layers. In this case, the odor-retaining particles may be applied together with the binder e.g. by spraying the binder solution or dispersion containing the odor-retaining particles.

The spun bond non-woven layer which be used as an odor filter layer in the present invention, may basically be prepared in accordance with conventional manufacturing methods except for modifications to incorporate and immobilize the odor-retaining particles in the non-woven.

Before explaining the method of incorporating and immobilizing the odor-retaining particles in spun bonds, the general manufacturing method of spun bonds is briefly described. Normally, a granulate polymer or mixture of granulate polymers is molten with the aid of extruders. Useful polymers are, for example, polypropylene, polyester, polyamide or polyethylene. The molten mass is pressed through so-called spinnerets, to form one or more filaments. Normally, plural spinnerets are arranged side-by-side, with the purpose of determining the width the produced web. After the formation of the filaments as such, the mono-filaments usually have to be stretched to achieve the desired fiber fineness. The stretching is achieved, for instance, by air or stretching rolls. The thus-formed fibers are laid on a screen belt and are consolidated thereafter. The consolidation is achieved, for instance, by thermal calendering, needling or by using high pressure water jets.

The following three ways may be used for immobilizing the odor-retaining particles in spun bonds.

The odor-retaining particles may be added to the polymer or polymer mixtures upon melting. Thereby, these will distribute uniformly in the liquid polymer. The further process is as described above.

Immediately after leaving the spinneret, the filaments are not yet cooled completely. In this state, the polymer has a soft tacky surface. If odor-retaining particles are blown onto the plurality of filaments immediately after leaving the spinnerets, these will therefore adhere to the surface and remain immobilized on the fiber and strongly fixed after solidification of the fiber.

A binder may be sprayed onto the spun bond non-woven and the odor-retaining particles applied thereafter. This may, for instance, be achieved by brushing or dusting. After the binder has dried, those odor-retaining particles, which are not firmly adhering, are removed from the web. This can be achieved by high suction, shaking, and blowing. The retaining particles are firmly fixed to the web. In the alternative, the odor-retaining particles may be mixed with the binder and be applied as a paste. In this case, there is no need to remove excessive particles.

The method of manufacturing melt blown layers is similar to the manufacturing of spun bond non-wovens, except for differences in the fiber fineness. Melt blown non-wovens normally have a fiber diameter of about 3 µm whereas the fiber diameter of spun bond non-wovens is about 18 µm. In addition, melt blown layers are normally not consolidated.

Due to the similar manufacturing processes, the methods of introducing the odor-retaining particles in melt blown non-wovens and spun bond non-wovens are similar. Specifically, odor-retaining particles may be added to the melt, blown onto the filament right after the spinneret, sprayed on the melt blown, which has been treated with a binder, and application in admixture with the binder as a paste.

In order to incorporate the odor-retaining particles in melt blown and spun bond non-wovens, the blowing of the particles onto the soft tacky filaments, the spraying on the filaments which have been treated with a binder, and the application on the filaments in admixture with the binder as a paste is preferred over the addition to the polymer melt as such.

The present invention is illustrated by way of the following Examples, which serve for illustration and may not be construed to limit the protective scope thereof.

EXAMPLES

Example 1

A zeolite-containing filter paper was prepared using an inclined screen-type paper machine. The base paper had a basis weight of 40.5 g/m$^2$ prior to binder treatment, and consisted of 70% sulphate pulp and 30% polyester fibers. The base paper was then treated in a size press with an aqueous binder mixture containing 7.1% vinyl acetate and 4% zeolite (Zeopur®-Micro 30: alumosilicate containing 75-85% clinoptilolite, 3-6% montmorillonite, 3-6% seladonite, and at most 5% calcium carbonate), followed by drying. The basis weight of the final paper was 46 g/m$^2$, and it contained 3.51 g/m$^2$ polyvinyl acetate and 1.99 g/m$^2$ zeolite. Further properties of the product are shown in Table 1.

Reference Example 1

A filter paper was prepared in the same way as described for Example 1 above, except that no zeolite was added to the binder mixture. The polyvinyl acetate content of the final filter was also 3.51 g/m$^2$. Further properties of the product are shown in Table 1 below.

Abrasion Loss

For determining the abrasion loss of the filter paper of Example 1 and Reference Example 1, the test apparatus in accordance with DIN 44956 T2 was used. The apparatus allows an accurately defined flow of gas to be passed through a planar specimen clamped in a holder.

According to the present invention, the air flow impinges on the specimen at 90 cm/s, the size of specimen is 200 cm$^2$ and the test lasts for two hours. The air is free of dust. Before and after the abrasion test, the weight of the specimen is determined. Prior to weighing, the specimen is conditioned to ensure the same moisture content of the specimen. The abrasion loss is the weight reduction in % of the specimen after the abrasion test in relation to before the test.

TABLE 1

|  |  | Reference Example 1 | Example 1 |
|---|---|---|---|
| Basis Weight | g/m$^2$ | 44 | 46 |
| Thickness | mm | 0.16 | 0.175 |
| Air Permeability | l/m$^2$s | 280 | 270 |
| Breaking Resistance in the Transverse Direction | N/15 mm | 40 | 40 |
| Breaking Resistance in the Longitudinal Direction | N/15 mm | 21 | 20 |
| Burst Strength | kPa | 135 | 130 |
| Abrasion loss | % | 0.05 | 0.05 |

It is seen from the above table that the abrasion loss of the filter paper is the same, irrespective of whether this contains zeolites or not. This suggests that, within the measurement accuracy, no zeolite is lost in the abrasion test. To corroborate this assumption, the ash content of the filter papers of Example 1 and Reference Example 1 was determined. The results are the following:
Reference Example 1 (no zeolites): 0.28%
Example 1 (before abrasion test): 3.54%
Example 1 (after abrasion test): 3.54%

It is evident from the above results that the abrasion loss of zeolites is 0% in the filter paper according to Example 1.

Ammonia Adsorption

To determine the capability of the filter media to adsorb ammonia, four sheets of the filter medium according to Example 1 having the size of DIN A4 corresponding to the size of commercially available vacuum filter bags are placed into a glass vessel. Similarly, four sheets of the filter medium according to Reference Example 1 of size DIN A4 are placed into another corresponding glass vessel. Then, four drops (about 0.2 ml) of aqueous 1% ammonia solution are added to the bottom of each vessel such that the solution does not get in contact with the filter medium. Subsequently, the vessel is closed. After five minutes, the glass vessel is opened again, and the odor in the glass vessel is evaluated independently by at least eight persons. The smell is rated from (++) (no discernable smell) to (−−)(very unpleasant smell). For comparison, a corresponding glass vessel containing the above amount of ammonia without any filter medium is used. The results were as follows.

The filter paper of Reference Example 1 was rated (−−), i.e. there was no discernible difference to the comparative glass vessel not containing any filter medium. In contrast, the filter paper of Example 1 was rated (++), both before and after the abrasion test.

Dust Odor Adsorption 3.7 g of usual home dust having a conspicuous smell is introduced in a 4 l exsiccator. Gases obtained from the headspace are passed through a clamped filter specimen having a diameter of 37 mm of the filter paper containing immobilized odor-retaining particles of Example 1. The testing is carried out at a collecting rate of 0.1 l/min for seven hours. The polar volatile organic compounds (VOC's) before and after the filter specimen are analyzed by GC (gas chromatography) coupled with a mass spectrometer and ionization (FID) or electron capture (ECD) detectors, respectively. The gas chromatographic analysis revealed a 25% reduction of VOC's.

The above results show that the filter layers containing immobilized zeolite particles, i.e. odor-retaining particles, of the invention have an excellent odor removing effect which is unaffected by the air flow in operating a vacuum cleaner equipped with a vacuum filter bag comprising these filter layers.

Example 2

A zeolite-containing filter paper was prepared as described in Example 1 except that the aqueous binder mixture for treating the base paper in a size press contained 6% of the zeolite.

Coffee Odor Adsorption

The odor removing effect of these filter media was determined as follows. To generate the odor of coffee to be absorbed, a tube of nalophane (Nalophane NA©) having a capacity of 400 l (Test Series 1) and 80 l (Test Series 2 and 3) respectively, was charged with 5 g of coffee and purified neutral air. The tube was stored at room temperature for two hours to form a saturated atmosphere of coffee odor. In Test Series 1, the coffee odor-containing air was directly transferred to the bags containing the filter paper of Example 2 and Reference Example 1. In Test Series 2 and 3, the coffee odor-containing air was first transferred to a tube of nalophane having a capacity of 400 l and this was filled with neutral air. The tube was allowed to sit for two hours to form a homogeneous gas. The above method of transferring the coffee odor-containing air into a second nalophane tube carried out in Test Series 2 and 3 serves to decrease the concentration of odor components.

The above-mentioned bags containing the filter paper of Example 2 and Reference Example 1 are as follows. 80 l bags made of nalophane film were used. Two of these bags were each provided with three sheets of the filter paper containing odor-retaining particles of Example 2. Two further bags were provided with the filter paper according to Reference Example 1 (i.e. without odor-retaining particles). After inserting the filter papers, the bags were closed and the remaining air pressed out. Subsequently, each bag was filled with the coffee odor prepared as described above. After storing for another two hours, samples of odor were taken.

The concentration of odor components in the sample was measured in accordance with DIN EN 13725 using an olfactometric device of the type of Olfaktometer System Mannebeck OLFAtec Typ T08, year of construction 2003. The measurements were carried out with one supervisor and four test persons.

The following Table 2 sets out the results:

TABLE 2

| Test Series | Initial odor concentration in GE/m$^3$** | Bag 1 (with filter paper of Example 2) | Bag 2 (with filter paper of Example 2) | Bag 3 (with filter paper of Reference Example 1) | Bag 4 (with filter paper of Reference Example 1) | Ratio of odor reduction |
|---|---|---|---|---|---|---|
| 1 | 5477 | 3042* | 2416* | 4206* | 4469* | 37% |
| 2 | 3866 | 228 | 342 | 2435 | 2435 | 88% |
| 3 | 1722 | 306* | 409* | 1637* | 999* | 73% |

*Mean value of two individual measurements
**Odor unit (Geruchseinheit, GE) according to the DIN EN 13725

In view of the above, the average ratio of odor reduction is 66%. Thereby, the odor reduction decreases with increasing starting concentrations. This is due to saturation effects of the odor-retaining particles.

The invention claimed is:

1. Vacuum filter bag comprising a layer containing immobilized odor-retaining particles arranged on the most downstream side of the vacuum filter bag, said layer selected from a filter paper, a dry laid non-woven and a wet laid non-woven and characterized in that the abrasion loss of said odor-retaining particles caused by an air flow of 90 cm/s through a 200 cm$^2$ specimen of said layer for two hours, measured in accordance with DIN 44956 T2, is 0 to 10% by weight of the total odor-retaining particles present before staffing the air flow, and wherein said odor-retaining particles are incorporated in the bulk of said filter paper and wet laid non-woven or are incorporated in a binder used in the making of said layer.

2. The vacuum filter bag according to claim 1, wherein the abrasion loss of the odor-retaining particles is ≦5% by weight.

3. The vacuum filter bag according to claim 1, wherein the abrasion loss of the odor-retaining particles is ≦1% by weight.

4. The vacuum filter bag according to claim 1, wherein the abrasion loss of the odor-retaining particles is substantially zero.

5. The vacuum filter bag according to claim 1, wherein the content of odor-retaining particles is from 4 to 14wt %, with respect to the layer containing the particles.

6. The vacuum filter bag according to claim 1 wherein the odor-retaining particles are made of zeolite or carbon.

7. Vacuum filter bag according to claim 1, which is a two-layered filter bag comprising a melt-blown layer arranged on the upstream side of the layer containing said immobilized odor-retaining particles.

8. Vacuum filter bag consisting essentially of one layer containing immobilized odor-retaining particles characterized in that the abrasion loss of said odor-retaining particles caused by an air flow of 90 cm/s through a 200 cm$^2$ specimen of said layer for two hours, measured in accordance with DIN 44956 T2, is 0 to 10% by weight of the total odor-retaining particles present before starting the air flow.

* * * * *